(12) United States Patent  
Ito (10) Patent No.: US 6,199,783 B1
(45) Date of Patent: Mar. 13, 2001

(54) SPINNING REEL FOR FISHING HAVING SPOOL SUPPORT STRUCTURE

(75) Inventor: Yukio Ito, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/274,019

(22) Filed: Mar. 22, 1999

(30) Foreign Application Priority Data

Mar. 20, 1998 (JP) .................................................. 10-071729

(51) Int. Cl.$^7$ .................................................. A01K 89/00
(52) U.S. Cl. .............................. 242/321; 242/322; 384/29
(58) Field of Search .................................. 242/321, 322, 242/273, 274; 384/7, 29, 42

(56) References Cited

U.S. PATENT DOCUMENTS

| | | | |
|---|---|---|---|
| 1,353,633 | * 9/1920 | Cothran | 384/29 |
| 2,632,608 | 3/1953 | Vincent . | |
| 2,663,599 | * 12/1953 | Mackay et al. | 384/29 |
| 2,974,895 | 3/1961 | Wood . | |
| 3,185,531 | * 5/1965 | Modrey | 384/29 X |
| 3,918,772 | * 11/1975 | Van Damme | 384/29 |
| 4,394,991 | * 7/1983 | Noda | 242/321 |
| 4,603,824 | * 8/1986 | McArdel | 384/29 X |
| 4,997,324 | * 3/1991 | Shirai et al. | 384/42 X |
| 5,558,289 | * 9/1996 | Hirayama et al. | 242/322 X |
| 5,836,698 | * 11/1998 | Richardson | 384/29 |

FOREIGN PATENT DOCUMENTS

| | | | |
|---|---|---|---|
| 803862 | * 4/1951 | (DE) | 384/29 |
| 2619077 | 11/1977 | (DE) . | |
| 2236151 | * 3/1991 | (GB) | 384/29 |
| 50-24542 | 7/1975 | (JP) . | |
| 309010 | * 12/1990 | (JP) | 384/29 |
| 6-11469 | 2/1994 | (JP) . | |

* cited by examiner

Primary Examiner—Donald P. Walsh
Assistant Examiner—Emmanuel M. Marcelo
(74) Attorney, Agent, or Firm—Liniak, Berenato, Longacre & White (57) ABSTRACT

In a spinning reel for fishing, a spool shaft having a spool at the end is slidably inserted into a flier shaft rotatably supported by a reel body so that the spool shaft can slide in the axial direction. A protruding sliding guide is formed in one of the outer circumference of the spool shaft and the inner circumference of the flier shaft. The sliding guide may be arranged at both end portions of the flier shaft in the longitudinal direction.

14 Claims, 7 Drawing Sheets

SPINNING REEL FOR FISHING HAVING SPOOL SUPPORT STRUCTURE

BACKGROUND OF THE INVENTION

The present invention relates to a spinning reel for fishing, which is improved in the fishing line winding operation property.

As well known, a conventional spinning reel for fishing is constructed as follows. A rotor is fixed to an end of a flier shaft (rotary cylindrical shaft) which is rotatably supported by a reel body via bearings. The rotor is rotated by the operation of a handle via a drive gear of the handle shaft and a pinion of the flier shaft which engages with the drive gear. A spool shaft is inserted into the flier shaft. A spool is attached to a protruding end of the spool shaft on the rotor side. The spool is reciprocated in the longitudinal direction of the reel body in linking with the rotation of the rotor by a traverse mechanism and an oscillating mechanism arranged on the rear end side of the spool shaft.

When a bail attached between bail arms of the rotor is moved to the fishing line winding position side and the rotor is rotated by operating a handle in the fishing line winding direction, a fishing line is wound onto the spool reciprocated in the longitudinal direction in linking with the rotation of the rotor. When the bail is inverted to the fishing line casting position side and a fishing tackle is cast, the fishing line wound around the spool is spirally drawn out from the spool.

The following problems may be encountered in the above conventional spinning reel for fishing. According to the structure of the above conventional spinning reel for fishing, when the rotor is rotated, the spool shaft inserted into the flier shaft slides in the longitudinal direction all over the inner circumference of the flier shaft. Therefore, the rotary efficiency is lowered by the influence of frictional resistance caused between the spool shaft and the flier shaft. Accordingly, the operation for winding or casting the fishing line is not smooth.

Figure 15:
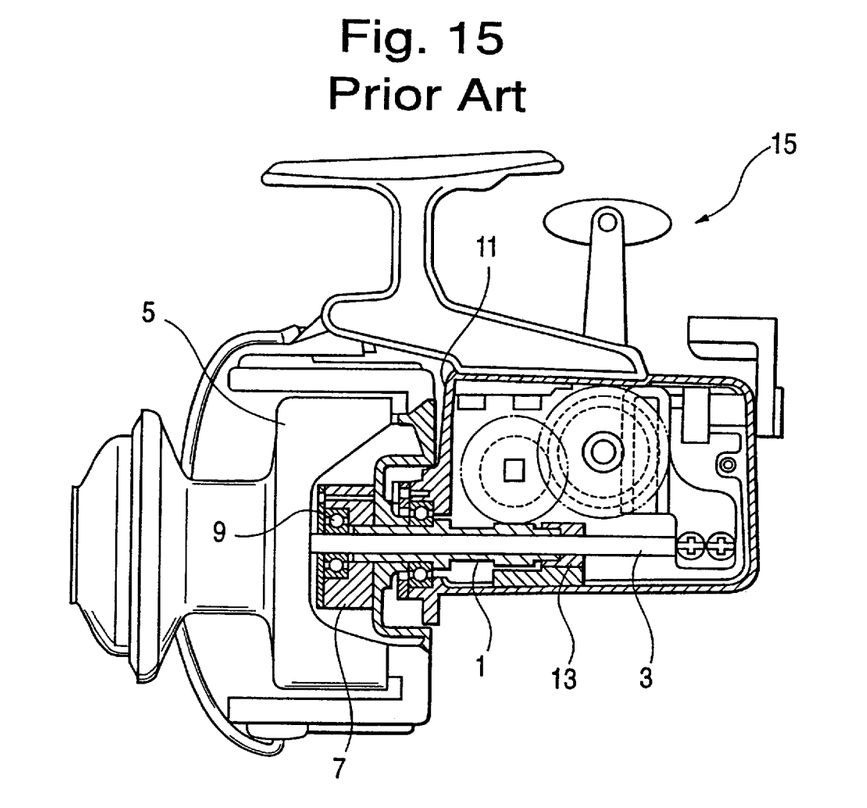
FIG. 15 is a a partially cut-away front view of a conventional spinning reel for fishing.

In order to solve the above problems and enhance the fishing line winding operation property, Japanese Examined Utility Model Publication Wo. 50-24542 discloses a spinning reel 15 constructed as shown in FIG. 15. In the spinning reel 15, a predetermined gap is provided between a flier shaft 1 and a spool shaft 3. One end of the spool shaft 3 is supported via a ball bearing 9 by a block 7 attached to a rotor 5 in such a manner that the spool shaft 3 can be moved in the axial direction, and the other end of the spool shaft 3 is supported by a bearing 13 provided on the reel body 11.

Figure 16:
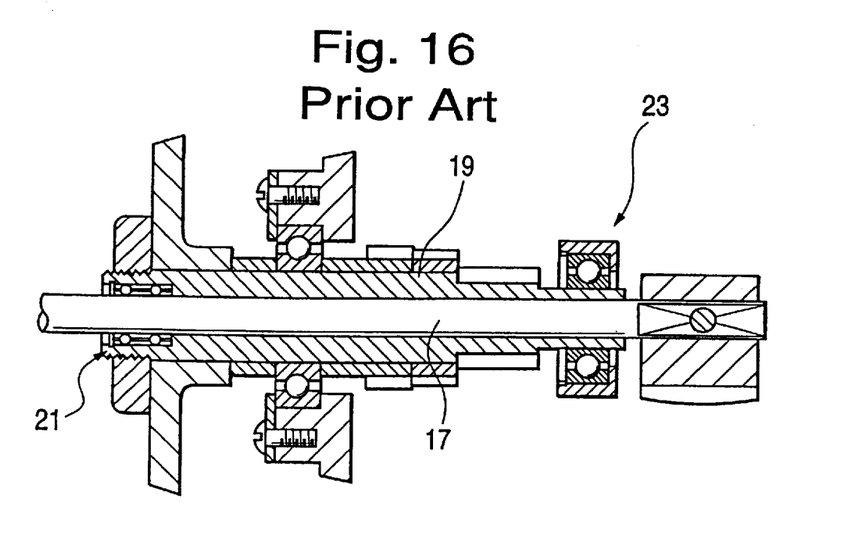
FIG. 16 is a cross-sectional view of a flier shaft and a spool shaft inserted into the flier shaft, which are used in another conventional spinning reel.

Japanese Unexamined Utility Model Publication No. 6-11469 discloses a spinning reel 23 constructed as shown in FIG. 16. The spinning reel 23 is provided with a rolling member 21 between the outer circumference of a spool shaft 17 and the inner circumference of a flier shaft 19 to enhance the fishing line winding operation property.

However, the above arrangements are disadvantageous as follows. The number of parts is increased, and thus the structure becomes complicated. This makes the assembly of the spinning reel in the manufacturing stage difficult, increases the manufacturing cost and make the disassembly of the spinning reel in the maintenance difficult.

If the ball bearing 9, bearing 13 and rolling member 21 are used as described above, the weight of the entire reel is increased. Therefore, the fishing line operation property is deteriorated.

SUMMARY OF THE INVENTION

The present invention has been accomplished in view of the above circumstances. It is an object of the present invention to provide a spinning reel for fishing characterized in that: the fishing line winding operation property is high without increasing the weight of the entire reel; the manufacturing cost is low; the structure is simple; and the disassembly is easily conducted.

In order to accomplish the above object, the invention provides a spinning reel for fishing in which a spool shaft having a spool at its end is slidably inserted into a flier shaft rotatably supported by a reel body so that the spool shaft can be slid in the axial direction. The spinning reel is characterized in that a protruding sliding guide is formed on one of the outer circumference of the spool shaft and the inner circumference of the flier shaft.

The sliding guide may be arranged at both end portions of the flier shaft in the longitudinal direction.

When the handle is operated in the fishing line winding direction, the spool shaft and the spool are reciprocated in the longitudinal direction in linking with the operation of the handle, and the fishing line is wound around the spool. The spool shaft slides in the axial direction while being partially supported by the sliding guide arranged on the inner circumference of the flier shaft or the outer circumference of the spool shaft. Therefore, frictional resistance caused between the inner circumference of the flier shaft and the outer circumference of the spool shaft can be reduced. As a result, the rotary efficiency of the rotor can be enhanced, and the fishing line can be wound around the spool in a good condition.

If the sliding guide is arranged on the inner circumference at both end portions of the flier shaft, lubricant injected between the flier shaft and the spool shaft can be held in the sliding guide over a long period of time. Therefore, lubrication can be stably maintained in a good condition.

The present disclosure relates to the subject matter contained in Japanese patent application No. Hei. 10-71729 (filed on Mar. 20, 1999), which is expressly incorporated herein by reference in its entirety.

DESCRIPTION OF THE PREFERRED EMBODIMENT

Referring to the accompanying drawings, embodiments of the present invention will be explained below.

Figure 1:
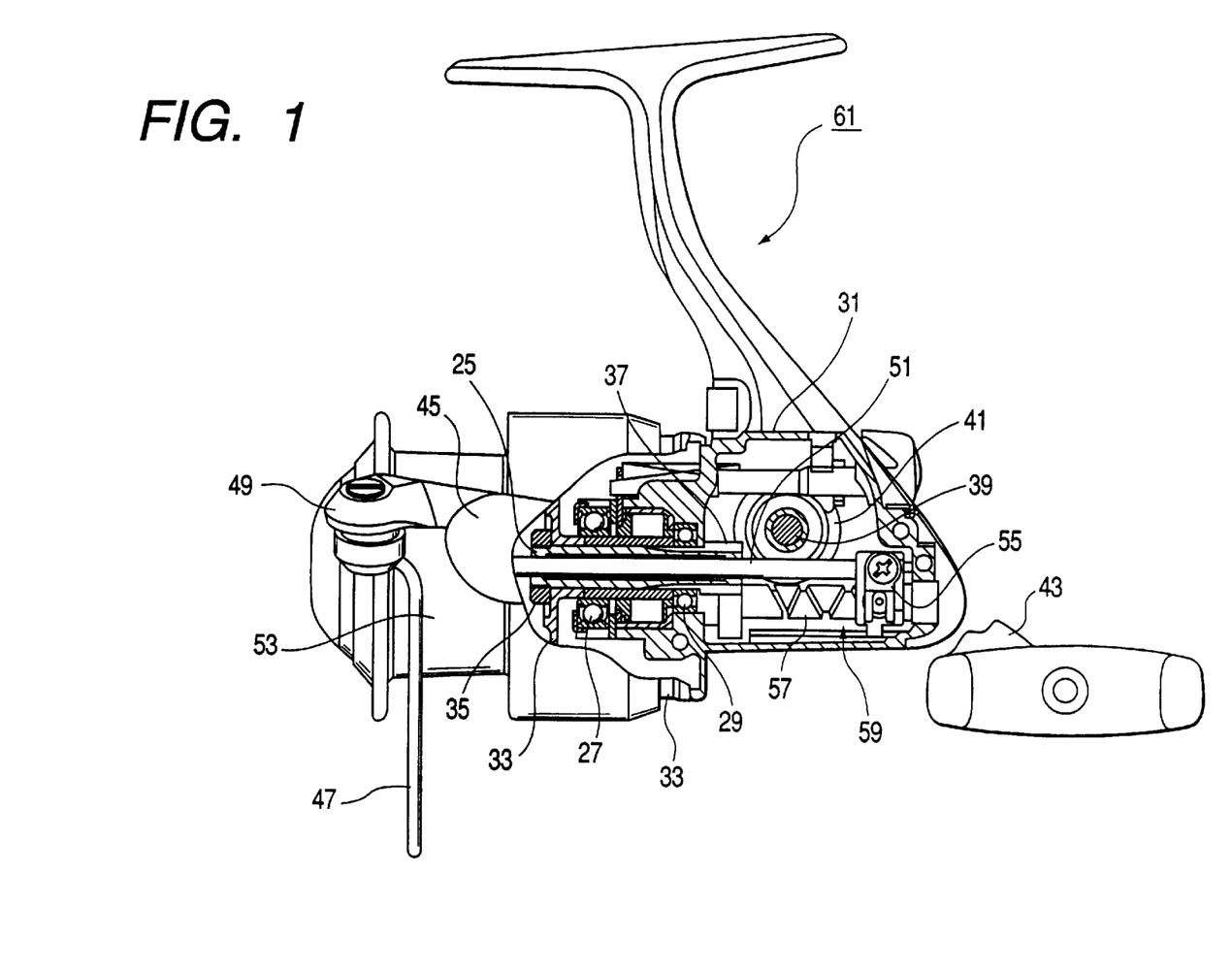
FIG. 1 is a partially cut-away front view showing a spinning reel for fishing, which constitutes a first embodiment of the present invention.
Figure 2:
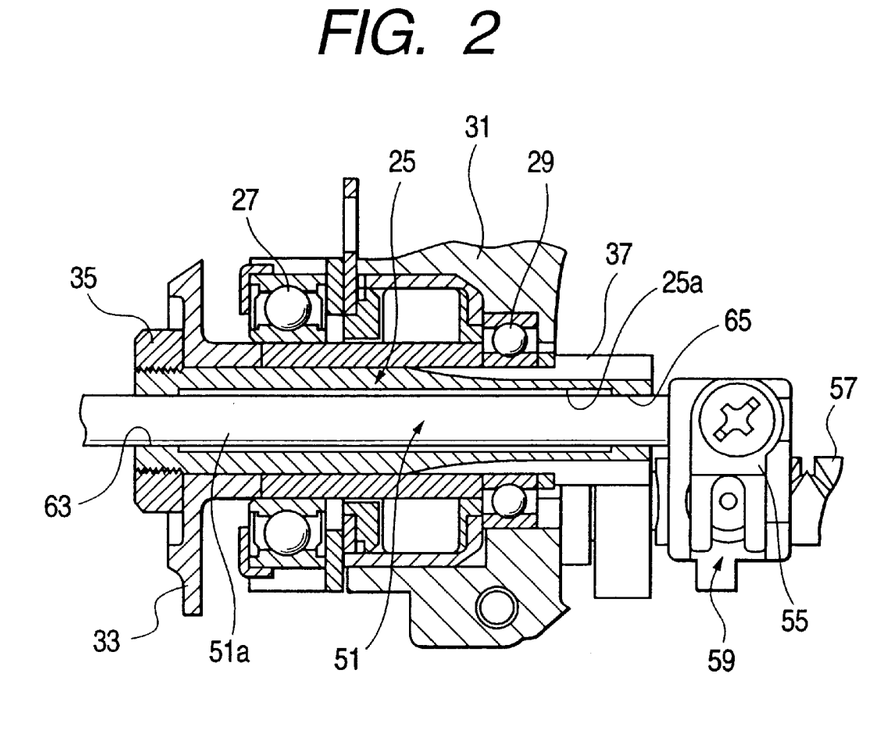
FIG. 2 is a cross-sectional view showing a primary part of the spinning reel shown in FIG. 1.
Figure 3:
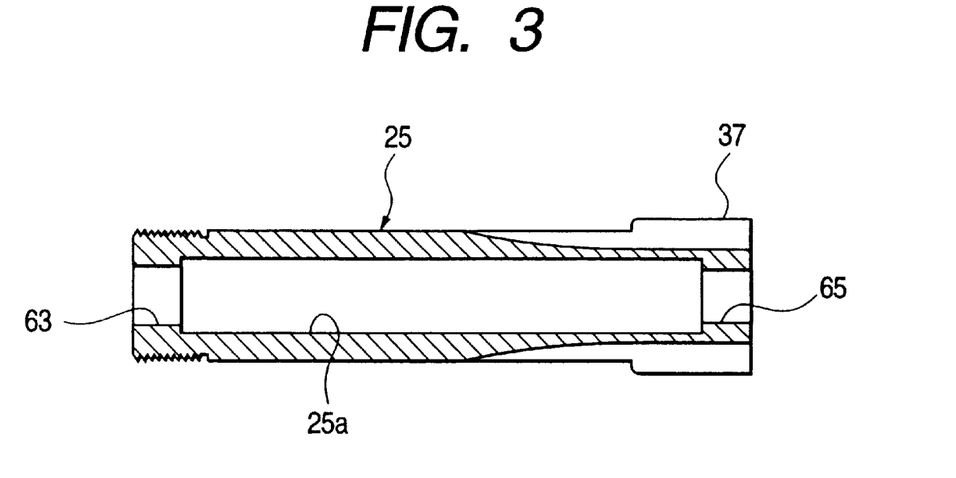
FIG. 3 is a cross-sectional view of a flier shaft used for the spinning reel shown in FIG. 1.

FIGS. 1 to 3 show a spinning reel for fishing, which constitutes a first embodiment of the present invention. In FIG. 1, reference numeral 25 is a hollow flier shaft rotatably supported by a front portion of the reel body 31 via bearings 27, 29. A rotor 33 is fixed to an end of the flier shaft 25 by a nut 35. A pinion 37 arranged on the outer circumference of the flier shaft 25 at the rear end of the flier shaft 25 is meshed with a drive gear 41 attached to a handle shaft 39. In the above arrangement, when the fishing line winding operation is conducted by a handle 43, the rotor 33 is rotated in the fishing line winding direction via the drive gear 41 and the flier shaft 25.

A pair of support arms 45 are formed integrally on the rotor 33. To the end portions of both support arms 45, a semi-annular bail 47 is attached via a bail arm 49 and a bail holder (not shown in the drawing) in such a manner that the bail 47 can be freely changed over, between the fishing line winding position and the fishing line casting position.

In FIG. 1, reference numeral 51 is a spool shaft inserted into the flier shaft 25 and attached to the reel body 31. A spool 53 is attached to a protruding end of the spool shaft 51 on the rotor side. At the rear end portion of the spool shaft 51, there is provided a traverse mechanism 59 including a sliding piece 55 and a traverse cam shaft 57. When the bail 47 is moved to the fishline winding position side and the rotor 33 is rotated in the fishing line winding direction by operating the handle, a fishing line (not shown in the drawing) is wound around the spool 53 which traverses in the longitudinal direction by the action of the traverse mechanism 59. When the bail 47 is moved to the fishing line casting position side and the fishing tackle is cast, the fishing line wound around the spool 53 is spirally drawn out from the spool 53.

The spinning reel 61 of this embodiment has the following characterizing features to improve the fishline winding operation performance.

As shown in FIGS. 2 and 3, annular sliding guides 63, 65 are provided at both end portions of the flier shaft 25 in the longitudinal direction, respectively. The annular sliding guides 63, 65 protrude along the inner circumference 25a of the flier shaft 25 so as to slidably come into contact with the outer circumference 51a of the spool shaft 51. Instead of the conventional structure in which the overall inner circumferential surface of the flier shaft slidably comes into contact with the outer circumference of the spool shaft, the spool shaft 51 is supported by the two sliding guides 63, 65 in this embodiment. When the rotor 33 is rotated by the operation of the handle in the fishing line winding direction, the spool shaft 51 supported by the sliding guides 63, 65 slides in the axial direction.

Since the spinning reel 61 of this embodiment is constructed as described above, when the bail 47 is moved to the fishing line winding position side in the same manner as that of the conventional reel for fishing and the rotor 33 is rotated by the handle in the fishing line winding direction, the spool shaft 51 and the spool 53 are reciprocated in the longitudinal direction, so that the fishing line can be wound around the spool 53. Since the spool shaft 51 is partially supported by the two sliding guides 63, 65 provided on the inner circumference 25a of the flier shaft 25 and slide on the two sliding guides 63, 65 in the axial direction of the flier shaft 25, frictional resistance between the inner circumference 25a of the flier shaft 25 and the outer circumference 51a of the spool shaft 51 is reduced as compared with the conventional reel for fishing. Consequently, the rotary efficiency of the rotor 33 can be enhanced, and the fishing line can be wound around the spool 53 in a good condition.

In general, lubricant is injected between the inner circumference 25a of the flier shaft 25 and the outer circumference 51a of the spool shaft 51. Both sliding guides 63, 65 prevent the injected lubricant from leaking out over a long period of time. Further even if foreign objects enter from a gap formed between the spool 53 and the rotor 33, the sliding guides 63, 65 prevent the foreign objects from getting into a space between the flier shaft 25 and the spool shaft 51.

As described above, frictional resistance between the inner circumference 25a of the flier shaft 25 and the outer circumference 51a of the spool shaft 51 can be reduced in this embodiment compared with the conventional reel for fishing. Therefore, the rotary efficiency of the rotor 33 can be enhanced and the operation property of winding the fishing line can be improved.

Further, this embodiment can provide the following advantages. Unlike the conventional reel for fishing shown in FIGS. 15 and 16, it is unnecessary to increase the number of parts of the reel for fishing, and only the protruding sliding guides 63, 65 are arranged on the inner circumference 25a of the flier shaft 25. That is, the structure of the reel for fishing of this embodiment is simple. Therefore, assembly in the process of manufacturing and disassembly in the process of maintenance can be easily conducted without increasing the weight of the entire reel. Further, the manufacturing cost can be reduced. Furthermore, since the sliding guides 63, 65 hold the injected lubricant in the space formed between the flier shaft 25 and the spool shaft 51, lubrication can be improved. Therefore, durability of the flier shaft 25 and that of the spool shaft 15 can be enhanced.

Further, this embodiment can provide the following advantages. The sliding guides 63, 65 are arranged on the inner circumference 25a of the flier shaft 25 in this embodiment. Therefore, even if foreign objects enter from a gap formed between the spool 53 and the rotor 33, there is no possibility that the foreign objects enter a space between the sliding guides 63, 65.

Figure 4:
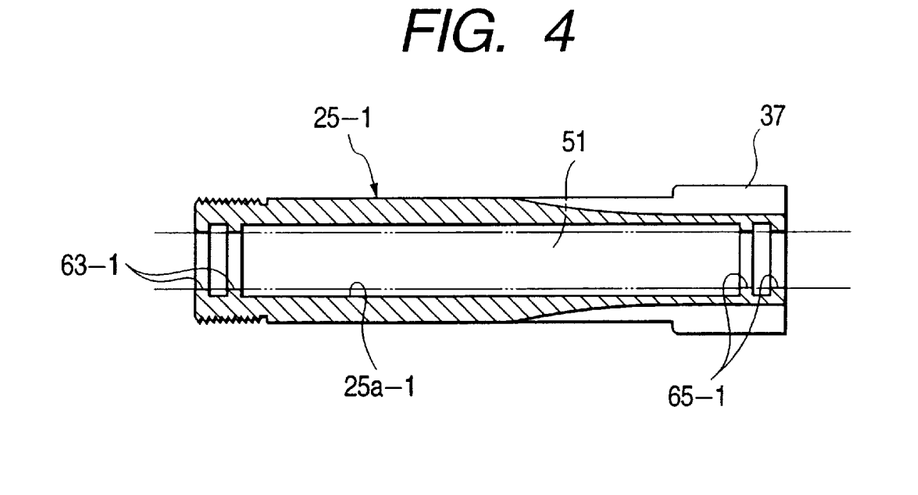
FIG. 4 is a cross-sectional view of a flier shaft used in a second embodiment.

FIG. 4 shows a second embodiment of the present invention. This embodiment is constructed as follows. Instead of the sliding guides 63, 65 described above, annular sliding guides 63-1, 65-1 are provided. Two annular sliding guides 63-1, each smaller in width than the sliding guides 63, are protruded from the inner circumference is of one longitudinal end portion of the flier shaft 25-1, whereas two annular sliding guides 65-1, each smaller in width than the sliding guides 65, are protruded from the inner circumferences of the other longitudinal end portion of the flier shaft 25-1. The spool shaft 51 is supported by the sliding guides 63-1, 65-1 and slides thereon in the axial direction.

Figure 5:
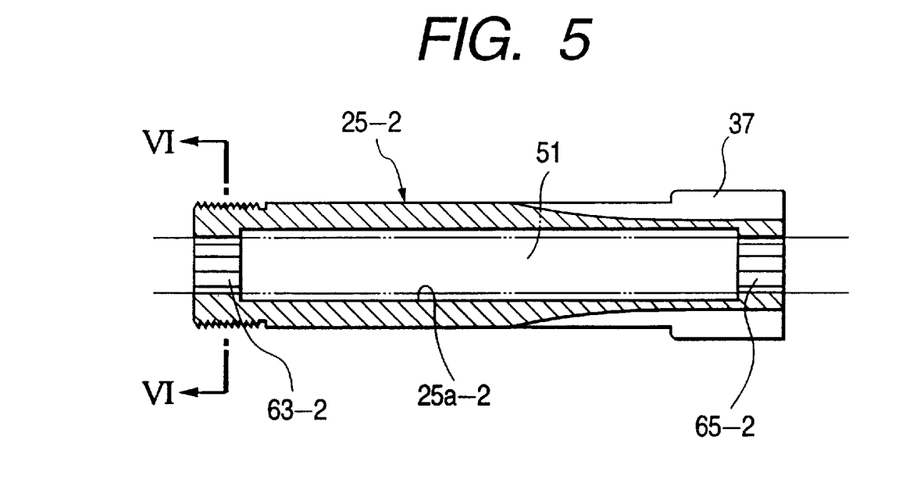
FIG. 5 is a cross-sectional view of a flier shaft used in a third embodiment.
Figure 6:
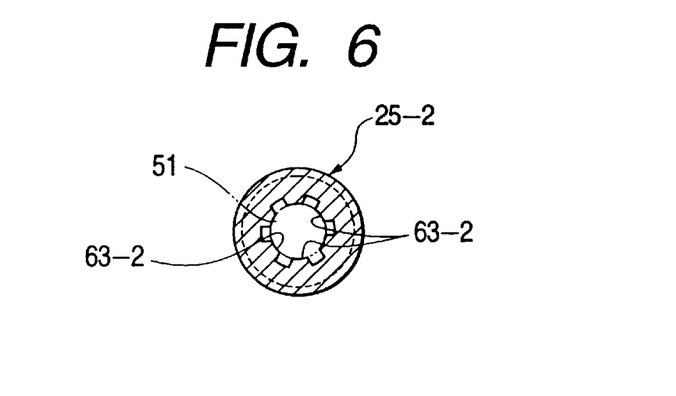
FIG. 6 is a cross-sectional view taken on line VI—VI of FIG. 5.

FIGS. 5 and 6 show a third embodiment of the present invention. As illustrated, this embodiment is characterized as follows. A plurality of radially protruding sliding guides 63-2 (65-2) are provided on the inner circumferences 25a-2 of the flier shaft 25-2 at a respective longitudinal end portion of the flier shaft 25-2. The sliding guides 63-2 (65-2) are narrow in width, elongated in the axial direction, and arranged at constant angular intervals in the circumferential direction. The spool shaft 51 is supported by the sliding guides 63-2, 65-2 and slides thereon in the axial direction.

In this connection, other points of structures of these embodiments are the same as those of the first embodiment. Therefore, the explanations will be omitted here.

According to the second and the third embodiments described above, in the same manner as that of the first embodiment, the rotary efficiency of the rotor 33 can be enhanced as compared with the conventional reel for fishing. Further, the weight of the overall reel is not increased, and assembly in the process of manufacturing and disassembly in the process of maintenance can be easily conducted. That is, it is possible to accomplish the objects of the present invention by the second and the third embodiment.

Figure 7:
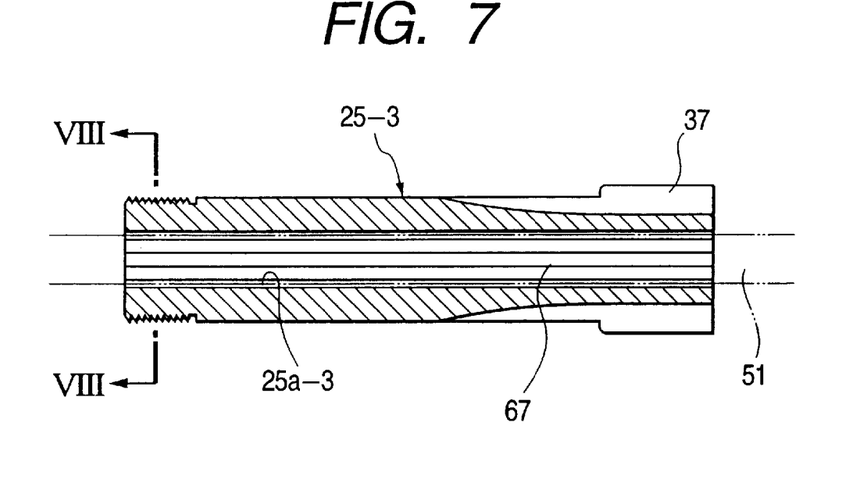
FIG. 7 is a cross-sectional view of a flier shaft used in a fourth embodiment.
Figure 8:
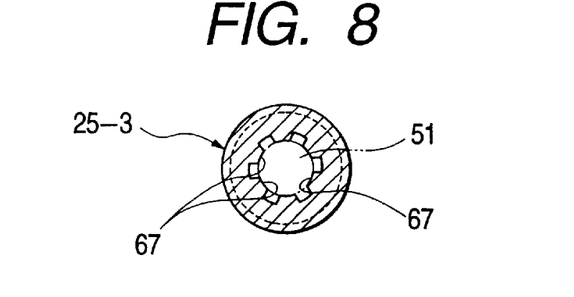
FIG. 8 is a cross-sectional view taken on line VIII—VIII of FIG. 7.

FIGS. 7 and 8 show a part of a spinning reel for fishing, which constitutes a fourth embodiment of the invention. As illustrated this embodiment is characterized in that: a plurality of narrow protruding sliding guides 67 are formed on the inner circumference 25a-3 of the flier shaft 25-3 to extend all over the length of the flier shaft 25-3. The spool shaft 51 is supported by the sliding guides 67 and slides thereon in the axial direction.

Figure 9:
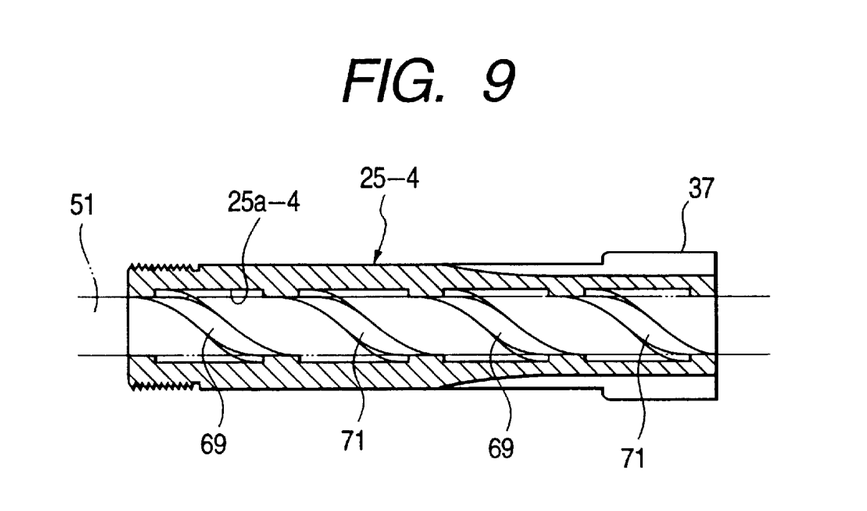
FIG. 9 is a cross-sectional view of a flier shaft used in a fifth embodiment.

FIG. 9 shows a part of a spinning reel for fishing, which constitutes a fifth embodiment of the present invention. This embodiment is constructed as follows. A pair of spiral protruding sliding guides 69, 71 are formed on the inner circumference 25a-4 of the flier shaft 25-4 to extend spirally in the axial direction of the flier shaft 25-4. The spool shaft 51 is supported by the sliding guides 69, 71 and slides thereon in the axial direction.

Other parts of structure of these embodiments are the same as those of the embodiment shown in FIG. 1. Therefore, the explanations are omitted here.

It is possible to accomplish the object of the invention by each embodiment described above in the same manner as that of the embodiment shown in FIG. 1.

Figure 10:
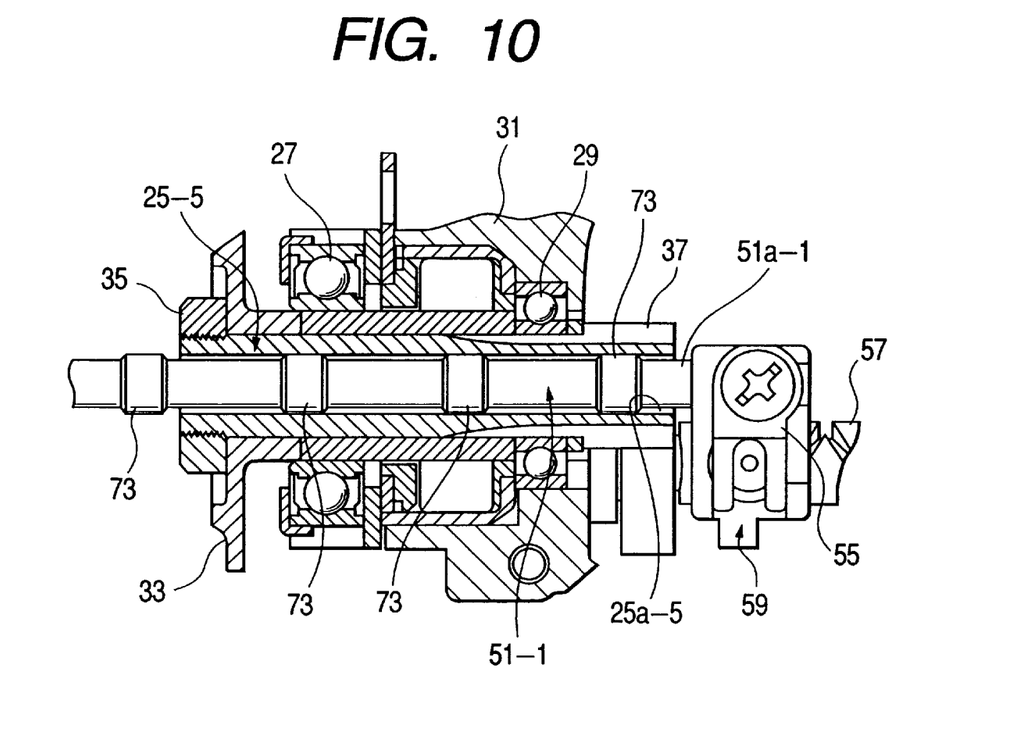
FIG. 10 is a cross-sectional view of a primary portion of a spinning reel for fishing, which constitutes a sixth embodiment.
Figure 11:
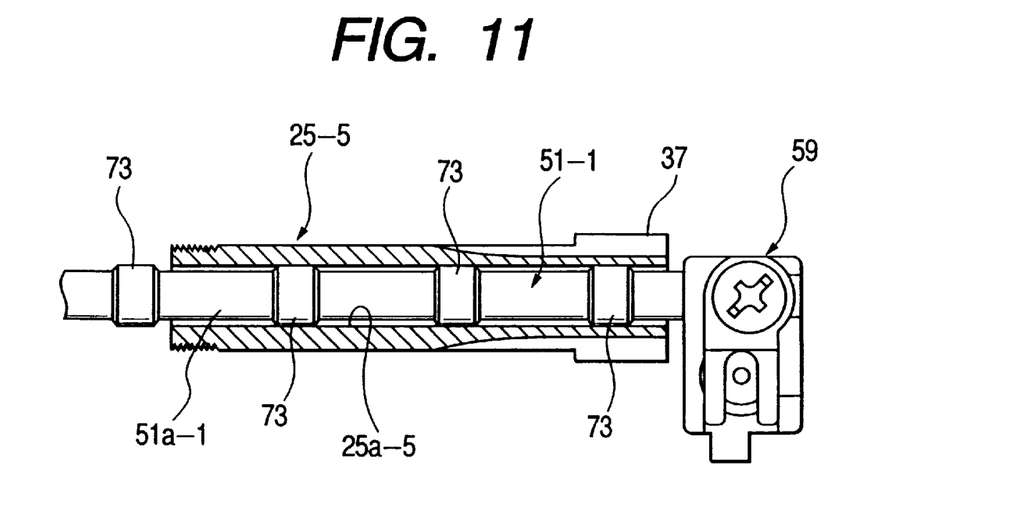
FIG. 11 is a cross-sectional view of a flier shaft and a spool shaft inserted into the flier shaft, which are used in the sixth embodiment shown in FIG. 10.

FIGS. 10 and 11 show a part of a spinning reel for fishing, which constitutes a sixth embodiment of the present invention.

Referring to the drawings, this embodiment will be explained below. Since the structure except for the characterizing portion of the reel is the same as that of the embodiment shown in FIG. 1, the same reference characters are used to indicate the same parts, and the explanations are omitted here.

In the drawings, reference numeral 25-5 is a hollow flier shaft rotatably supported by a front portion of the reel body 31 via bearings 27, 29. A rotor 33 is fixed to an end of the flier shaft 25-5 by a nut 35. A spool shaft 51-1 is inserted into the flier shaft 25-5, and a spool 53 is attached to a protruding end of the spool shaft 51-1 on the rotor side. When a handle 43 is operated in the fishing line winding direction, a fishing line can be wound around the spool 53 reciprocated in the longitudinal direction by a traverse mechanism 59.

As shown in FIG. 11, a plurality of annular sliding guides 73 are provided at predetermined intervals on an outer circumference 51a-1 of the spool shaft 51-1. The sliding guides 73 slidably come into contact with an inner circumference 25a-5 of the flier shaft 25-5. Instead of the conventional structure in which the overall inner circumferential surface of the flier shaft slidably comes into contact with the outer circumference of the spool shaft, this embodiment employs the structure that the spool shaft 51-1 is supported to the flier shaft 25-5 through the sliding guides 73. When the rotor 33 is rotated by operating the handle 43, the sliding guides 73 slide on the inner circumference 25a-5 of the flier shaft 25-5, so that the spool shaft 51-1 is reciprocated in the longitudinal direction.

The sliding guides 73 are distributed such that the spool shaft 51-1 can be held by at least two sliding guides 73 at any time during when the spool shaft 51-1 is moved within its stroke. That is, in this embodiment a plurality of the sliding guides 73 are provided on a portion of the spool shaft 51-1 which can be located within the flier shaft 25-5 during when the spool shaft is moved within its stroke.

In this Embodiment constructed as described above, when the bail is moved to the fishing line winding position side and the rotor 33 is rotated in the fishing line winding direction by operating the handle, the spool shaft 51-1 and the spool 53 are reciprocated in the longitudinal direction in linking with the rotation of the rotor 33, so that the fishing line can be wound around the spool 53. The plurality of sliding guides 73 of the spool shaft 51-1 slide on the inner circumference 25a-5 of the flier shaft 25-5 in the axial direction. Therefore, frictional resistance between the inner circumference 25a-5 of the flier shaft 25-5 and the outer circumference 51a-1 of the spool shaft 51-1 can be reduced in comparison with the conventional spinning reel. Consequently, the rotary efficiency of the rotor 33 can be enhanced, and the fishing line can be wound round the spool 53 in a good condition.

As described above, in this embodiment, frictional resistance between the inner circumference 25a-5 of the flier shaft 25-5 and the outer circumference 51a-1 of the spool shaft 51-1 can be reduced in comparison with the conventional spinning reel. Accordingly, the rotary efficiency of the rotor 33 can be enhanced, and the fishing line winding operation property can be improved.

Further, this embodiment can provide the following advantages. Unlike the conventional reel for fishing shown in FIGS. 15 and 16, it is unnecessary to increase the number of parts of the reel for fishing, and only the protruding sliding guides 73 are arranged on the outer circumference 51a-1 of the spool shaft 51-1. That is, the structure of the reel for fishing of this embodiment is simple. Therefore, assembly in the process of manufacturing and disassembly in the process of maintenance can be easily conducted without increasing the weight of the entire reel. Further, the manufacturing cost can be reduced. Since the sliding guides 73 are provided on the outer circumference 51a-1 of the spool shaft 51-1 instead of the inner circumference of the flier shaft, machining for forming the sliding guides can be performed easily in comparison with the spinning reels of the embodiments shown in FIGS. 1 to 9.

Figure 12:
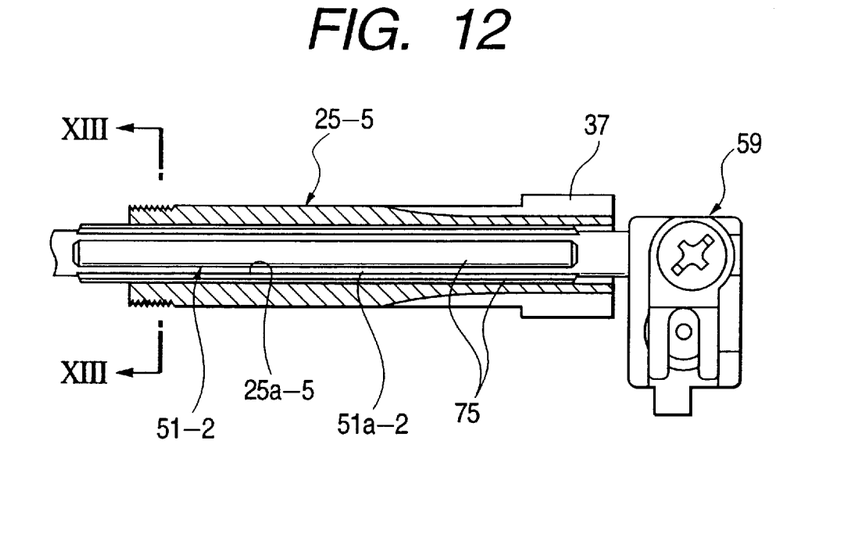
FIG. 12 is a cross-sectional view of a flier shaft and a spool, shaft inserted into the flier shaft, which are used in a seventh embodiment.
Figure 13:
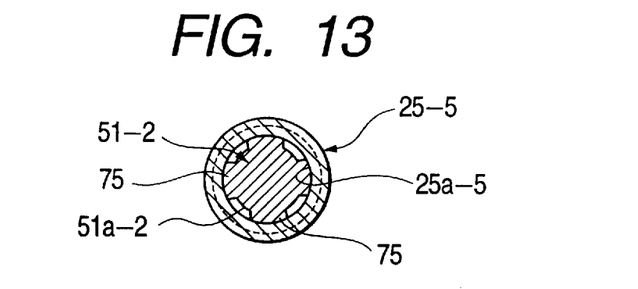
FIG. 13 is a cross-sectional view taken on line XIII—XIII of FIG. 12.

FIGS. 1 and 13 show a part of a spinning reel for fishing, which constitutes a seventh embodiment. This embodiment is constructed as follows. Four protruding sliding guides 75 are provided at the interval of 90° on the outer circumference 51a-2 of the spool shaft 51-2. Each of the protruding sliding guides 75 is elongated in the axial direction of the spool shaft 51-2 by a predetermined length. The spool shaft 51-2 is supported to the flier shaft 25-5 through the sliding guides 75. When the rotor 33 is rotated by operating the handle 43, the sliding guides 75 slide on the inner circumference 25a-5 of the flier shaft 25-5, so that the spool shaft 51-2 can be reciprocated in the longitudinal direction.

Figure 14:
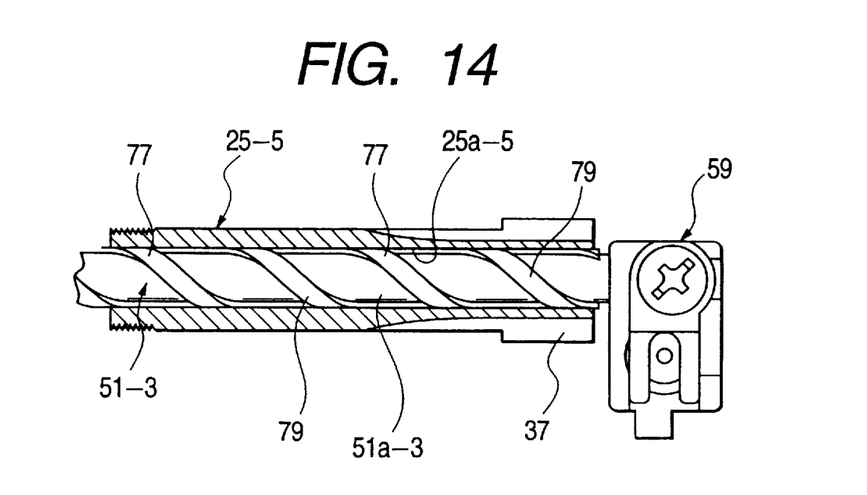
FIG. 14 is a cross-sectional view of a flier shaft and a spool shaft inserted into the flier shaft, which are used in an eighth embodiment.

FIG. 14 shows a part of a spinning reel for fishing, which constitutes an eighth embodiment. This embodiment is constructed as follows. Two spiral protruding sliding guides 77, 79 are provided on the outer circumference 51a-3 of the spool shaft 51-3 to extend spirally in the axial direction of the spool shaft 51-3. The spool shaft 51-3 can slide in the axial direction along the flier shaft 25-5 through the sliding guides 77, 79.

In addition, other points of structure of the embodiments shown in FIGS. 12 to 14 are the same as those of the embodiment shown in FIG. 1. Therefore, the explanations are omitted here.

In the embodiments described above, in the same manner as that of the embodiment shown in FIG. 10, the rotary efficiency of the rotor 33 can be enhanced, and the fishing line winding operation property can be improved. Further, the weight of the overall reel is not increased, and assembly in the process of manufacturing and disassembly in the process of maintenance can be enhanced. Furthermore, machining for forming the sliding guides can be performed easily in comparison with the embodiments shown in FIGS. 1 to 9. Accordingly, the manufacturing cost can be reduced.

What is claimed is:

1. A spinning reel for fishing in which a spool shaft having a spool is slidably inserted into a flier shaft rotatably supported by a reel body so that the spool shaft can slide in an axial direction, said spinning reel comprising:

a protruding sliding guide means, formed on one of an outer circumference of the spool shaft and an inner circumference of the flier shaft, for contacting the other of the outer circumference of the spool shaft and the inner circumference of the flier shaft, a pinion provided on the outer circumference of flier shaft, said pinion adapted to drivingly engage a drive gear drive by a handle shaft, wherein said sliding guide means includes a pair of sliding guides respectively arranged at axial end portions of the flier shaft, and wherein one of said pair of sliding guides is disposed radially inside said pinion with respect to an axis of said spool shaft.

2. The spinning reel according to claim 1, wherein said pinion and said pair of sliding guides are formed as an integral unitary body with said flier shaft.

3. A spool support structure for supporting a spool axially movably with respect to a main body, said structure comprising:

a hollow flier shaft rotatably supported by the main body;

a spool shaft to which the spool is fixed;

at least first and second sliding guides integrally formed as a unitary body with one of the flier shaft and the spool shaft, said first and second sliding guides contacting the other of the flier shaft and the spool shaft when the spool shaft is axially movably inserted into the flier shaft.

4. The spool support structure according to claim 3, wherein said first and second sliding guides are integrally provided on axial end portions of the flier shaft, respectively.

5. The spool shaft structure according to claim 4, wherein each of the first and second sliding guides is annular.

6. The spool support structure according to claim 4, wherein each of the first and second sliding guides includes two ribs extending circumferentially.

7. The spool support structure according to claim 4, wherein each of the first and second sliding guides includes a plurality of ribs extending axially.

8. The spool support structure according to claim 4, wherein the fit and second sliding guides define an annular space therebetween in an axial direction and between an inner circumference of the flier shaft and an outer circumference of the spool shaft in a radial direction.

9. The spool support structure according to claim 3, wherein said at least first and second sliding guides includes a plurality of ribs integrally provided on the flier shaft and elongated axially along substantially the entire length of the flier shaft.

10. The spool support structure according to claim 3, wherein said at least first and second sliding guides includes a pair of ribs integrally provided on the flier shaft and elongated spirally along substantially the entire length of the flier shaft.

11. The spool support structure according to claim 3, wherein a plurality of sliding guides are integrally provided on the spool shaft at constant intervals in an axial direction.

12. The spool support structure according to claim 3, wherein said at least first and second sliding guides includes a plurality of ribs integrally provided on the spool shaft and elongated axially along the spool shaft.

13. The spool support structure according to claim 3, wherein said at least first and second sliding guides includes a pair of ribs integrally provided on the spool shaft and elongated spirally along the spool shaft.

14. The spool shaft structure according to claim 3, wherein said flier shaft comprises an integral pinion, and said first and second sliding guides are formed as an integral unitary body with said spool shaft.

* * * * *